United States Patent
Morein et al.

(10) Patent No.: US 6,445,392 B1
(45) Date of Patent: Sep. 3, 2002

(54) METHOD AND APPARATUS FOR SIMPLIFIED ANTI-ALIASING IN A VIDEO GRAPHICS SYSTEM

(75) Inventors: Stephen L. Morein, Cambridge; Mark C. Fowler, Hopkinton, both of MA (US); Richard G. Fadden, San Jose, CA (US)

(73) Assignee: ATI International SRL, Barbados (BB)

( * ) Notice: Subject to any disclaimer, the term of this patent is extended or adjusted under 35 U.S.C. 154(b) by 0 days.

(21) Appl. No.: 09/339,732

(22) Filed: Jun. 24, 1999

(51) Int. Cl.$^7$ .............................................. G06T 15/40
(52) U.S. Cl. ...................... 345/422; 345/611
(58) Field of Search .................... 345/422, 611, 345/614, 515, 419, 506, 473, 426

(56) References Cited

U.S. PATENT DOCUMENTS

| | | | | |
|---|---|---|---|---|
| 5,854,631 A | * | 12/1998 | Akeley et al. ............... | 345/419 |
| 5,870,109 A | * | 2/1999 | McCormack et al. ....... | 345/515 |
| 6,072,500 A | * | 6/2000 | Foran et al. ................ | 345/431 |
| 6,163,319 A | * | 12/2000 | Peercy et al. ............... | 345/426 |
| 6,252,608 B1 | * | 6/2001 | Snyder et al. .............. | 345/473 |
| 6,268,874 B1 | * | 7/2001 | Niu et al. ................... | 345/506 |

OTHER PUBLICATIONS

Foley et al., Computer Graphics: Principles and Practice, Second Edition in C, 1996, Addison–Wesley Publishing Co., pp. 619–621.*

* cited by examiner

Primary Examiner—Mark Zimmerman
Assistant Examiner—Lance W. Sealey
(74) Attorney, Agent, or Firm—Vedder, Price, Kaufman & Kammholz

(57) ABSTRACT

A method and apparatus for determining and utilizing Z values of fragments in an anti-aliasing video graphics system is described. This method and apparatus are accomplished by sampling the fragment to produce a plurality of samples where a valid sample indicate coverage of a pixel by the fragment at a portion of the pixel corresponding to the valid sample. The Z value of a front-most valid sample of the plurality of samples is then determined. This Z value is preferably determined by determining the Z value at a reference point within the pixel and then ranking the various samples based on their positions and the slopes of the Z value in the horizontal and vertical directions with respect to the reference point. The highest ranked sample that is a valid sample is then selected, and the Z value for that sample is calculated based on the Z value at the reference point, the position of the selected sample with respect to the reference point, and the slopes. Once the Z value of the front-most sample of the plurality of samples has been determined, this Z value is used as the Z value for all of the valid samples within the fragment.

15 Claims, 5 Drawing Sheets

Sampling Grid 40

METHOD AND APPARATUS FOR SIMPLIFIED ANTI-ALIASING IN A VIDEO GRAPHICS SYSTEM

FIELD OF THE INVENTION

The invention relates generally to video graphics processing and more particularly to a method and apparatus for video graphics anti-aliasing that utilizes a limited Z value sampling.

BACKGROUND OF THE INVENTION

Computers are used in many applications. As computing systems continue to evolve, the graphical display requirements of the systems become more demanding. This is especially true in the area of three-dimensional (3D) graphics processing. In order to process 3D graphics images, the position of graphics primitives with respect to the display must be understood in all three dimensions. This includes the dimension of depth, often referred to as the Z dimension. The Z dimension describes the positioning of a video graphics primitive with respect to other video graphics primitives within the display frame in terms of the depth, or distance from the viewer, of the graphics primitives.

Computer displays and other high-resolution display devices such as high-definition televisions (HDTVs), projectors, printers, plotters, and the like, present an image to the viewer as an array of individual picture elements, or pixels. The individual pixels are each given a specific color, which corresponds to the color of the image at the location of the particular pixel. The pixels are closely spaced, and the viewer's visual system performs a filtering of the individual pixel colors to form a composite image. If the partitioning of the image into individual pixel elements is performed properly, and the pixels are close enough together, the viewer perceives the displayed array of pixels as a virtually continuous image. Despite the viewer's visual filtering, the viewer remains sensitive to aberrations in the image, and video graphics systems must be designed to minimize these aberrations.

In many systems, graphics images for display are sampled and the image is regenerated based on the stored samples. When the conservation of detail is important, oversampling is typically utilized to avoid aliasing in the reconstructed graphical image. Oversampling techniques are well known in the art. In an oversampling system, multiple samples of each screen element, or pixel, are stored. Although each pixel is rendered using only a single color value, each of the samples for that particular pixel are used in generating the final color. In effect, a much more detailed, higher resolution version of the image is stored within the computer and this version is used to generate each of the colors for the pixels displayed on the screen.

In an oversampling system that generates eight samples per pixel, each sample within the pixel consists of a color value and a Z value. The color value determines the color of the particular sample within the pixel, whereas the Z value determines the depth coordinate of the sample. As video graphics primitives are received that need to be merged with the pixel information already present for a particular display frame, the primitives are used to generate a number of pixel fragments. A pixel fragment corresponds to a particular pixel within the display frame which is identified by a set of X and Y coordinates. The fragments are typically oversampled in the same manner as pixels stored in the frame buffer. Each sample of the fragment consists of a color value and a Z value. Each of the color and Z values must be merged with the pixel information already stored for the particular display frame in order to generate a blended pixel that includes information already stored for the pixel and that received corresponding to the graphics primitive that produce the fragment.

Performing the computations required to merge a fragment having a number of different Z values corresponding to each of its samples with a pixel that also may include a number of different Z values can be very computationally complex. The bandwidth and other resources necessary to perform such calculations can reduce display processing speed and efficiency. One prior art solution that reduces the complexity of the calculations required to merge fragments is to store a single Z value corresponding to the center of the fragment for the entire fragment. This Z value is then used as an approximation to the Z value for all samples in the fragment in the merging operations.

However, problems can arise when the Z value at the center point of the pixel is used. This is especially true when two fragments intersect within a pixel, where one fragment only extends partially into the pixel, whereas the other fragment completely covers the pixel and has a Z value that should cause the complete coverage fragment to completely cover, from a viewer's perspective, the partial fragment. If the fragment with partial coverage is extrapolated in the Z plane to extend to the middle of the pixel, the center pixel Z value for this partial fragment may effectively "poke through" the other fragment. When this "poke through" problem occurs, some color contribution from the partial fragment, which should not be visible, will be contributed to the final coloration of the pixel. This results in undesirable visual artifacts. The "poke through" artifact is described in more detail with reference to FIG. 1 below.

Therefore, a need exists for an anti-aliasing technique that is able to use a single Z value for an entire pixel fragment and yet avoid the visual artifacts induced by "poke through" and other problems that result from using the Z value at the center point of a pixel fragment.

DETAILED DESCRIPTION OF A PREFERRED EMBODIMENT OF THE INVENTION

Generally, the present invention provides a method and apparatus for determining and utilizing Z values of fragments in an anti-aliasing video graphics system. This is accomplished by sampling the fragment to produce a plurality of samples where a valid sample indicate coverage of a pixel by the fragment at a portion of the pixel corresponding to the valid sample. The Z value of a front-most valid sample of the plurality of samples is then determined. This Z value is preferably determined by determining the Z value at a reference point within the pixel and then ranking the various samples based on their positions and the slopes of the Z value in the horizontal and vertical directions with respect to the reference point. The highest ranked sample that is a valid sample is then selected, and the Z value for that sample is calculated based on the Z value at the reference point, the position of the selected sample with respect to the reference point, and the slopes. Once the Z value of the front-most sample of the plurality of samples has been determined, this Z value is used as the Z value for all of the valid samples within the fragment.

By selecting the front-most valid sample as the Z value to utilize for an entire pixel fragment, processing complexity is greatly reduced, as only one Z value for the fragment must be recognized. The "poke through" artifact that existed in prior art solutions that utilized the Z value of the fragment at the center point of the pixel is avoided, as partially overlapping fragments will be correctly handled as only Z values at valid samples are recognized. Although some color shifting may occur due to utilization of the front-most Z value as the Z value for the entire fragment, the visual effects of such color shifting are minimal in comparison to the visual effects caused by the "poke through" artifact.

Figure 1:
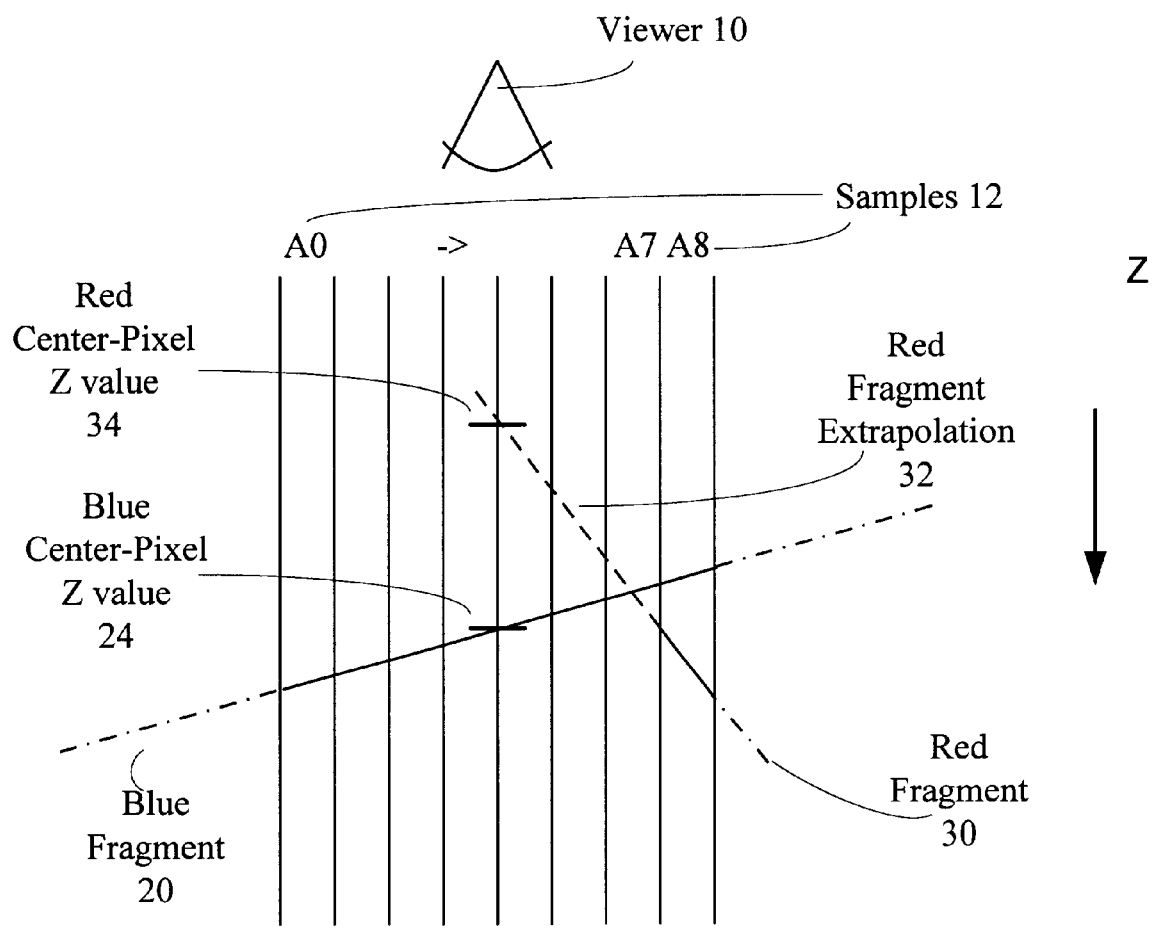
FIG. 1 illustrates a prior art diagram of a pixel that includes two fragments resulting in the "poke through" artifact.

The invention can be better understood with reference to FIGS. 1–7. FIG. 1 illustrates a cross sectional view of a pixel from the prospective of a viewer 10. The example in FIG. 1 illustrates the "poke through" artifact experienced in prior art solutions that used a center-point Z value as the sole Z value for each fragment. The cross section of the pixel includes a number of samples 12 (A0–A8). Each of the columns associated with each of the samples represents a two-dimensional view of a particular portion of the pixel. Note that the Z-axis extends in the downward direction such that objects further away from the viewer 10 will be positioned further down in the two-dimensional representation of the pixel. Each of the samples 12 represents a small portion of the pixel in this two-dimensional view. The dimension illustrated in addition to the Z dimension may be the X direction or the Y direction.

Two fragments, a red fragment 30 and a blue fragment 20, are shown to contribute to the pixel illustrated. The fragments, which are planar surfaces, are viewed in the diagram as lines where the planes intersect the two-dimensional portion of the pixel illustrated. The blue fragment 20 extends across the entire pixel and has a blue center-pixel Z value 24 as illustrated. The red fragment 30 only extends across the pixel to a distance that covers the sample A8. However, if the Z value for the red fragment 30 were to be represented with a single Z value corresponding to the center pixel Z value for the red fragment, the red fragment would be extrapolated along the red fragment extrapolation 32 and the resulting Z value would be the red center-pixel Z value 34 as shown.

Because the red fragment 30 has a center pixel Z value 34 that is, from the prospective of the viewer, in front of the center pixel Z value of the blue fragment, the red fragment 30 will contribute to the overall pixel color. This contribution, as determined in blending operations, is based on the number of valid samples in the pixel resulting from the red fragment 30. Because the red fragment 30 only covers the A8 sample, the color contribution due to the red fragment 30 will be minimal, however the final color for the pixel will include some red coloration. Note that the blue fragment 20 in fact completely overlays the red fragment 30, and no portion of the red fragment 30 should be visible. Thus, the contribution of red to the overall coloration of the pixel is an example of the "poke through" artifact discussed earlier. This artifact can result in fragments that are positioned behind other fragments "poking through" to effect coloration of the particular pixel in which the fragments are present. This discoloration is visible to the viewer 10 and is undesirable.

Figure 2:
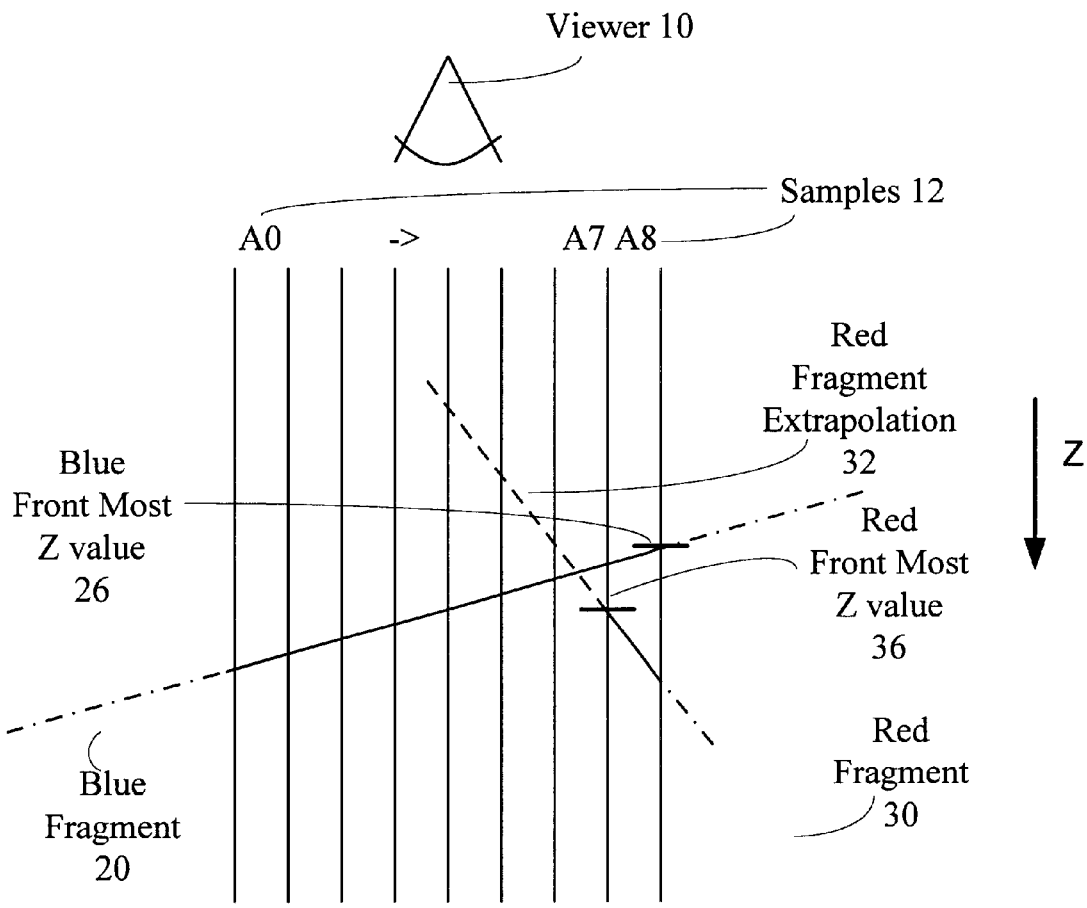
FIG. 2 illustrates a diagram of a pixel including two fragments where the "poke through" artifact is avoided in accordance with the present invention.

FIG. 2 illustrates the same pixel as viewed by the viewer 10 including the samples 12 (A0–A8). However, in this case, rather than merging the two fragments based on the center pixel Z values, a Z value corresponding to the front most valid sample is utilized. Although the present invention describes a preferred embodiment for determining the Z value for the front-most sample of each fragment, various techniques may be employed to determine the front-most Z value that is used for the blending operations performed within the video graphics system.

As is illustrated, the front-most valid pixel for the red fragment 30 is the A8 pixel. The Z value corresponding to the A8 sample of the red fragment 30 is illustrated as the red front-most Z value 36. Similarly, the front-most sample of the blue fragment 20 is also the A8 sample. The Z value of this sample is illustrated as the blue front-most Z value 26. Note that the blue front-most value 26 is positioned, with respect to the viewer, in front of the red front-most Z value 36. As such, no contribution to the color of the pixel illustrated will be provided by the red fragment 30, and the entire pixel will be blue. Thus, by utilizing the Z value of the front-most value sample within a fragment sample set to represent the Z value for the entire fragment, the "poke through" artifact described with respect to FIG. 1 is avoided.

Figure 3:
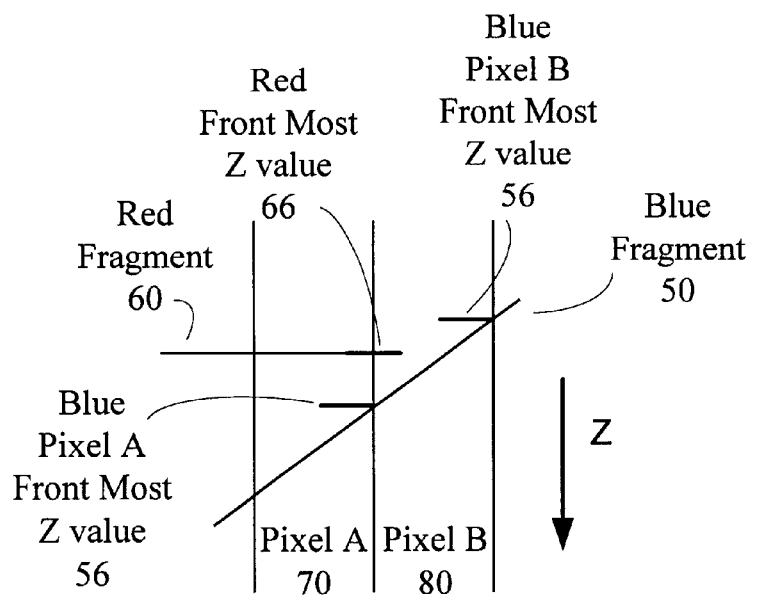
FIG. 3 illustrates a diagram of two neighboring pixels and the color shifting that results from removal of the "poke through" artifact in accordance with the present invention.

FIG. 3 illustrates a color shift that can occur as a result of utilizing the front-most Z value for pixel fragments in processing. It should be noted that the color shifting illustrated in FIG. 3, which essentially moves the intersection point of intersecting surfaces, is a much less-visible artifact than that resulting from the "poke through" scenario. FIG. 3 illustrates two neighboring pixels, pixel A 70 and pixel B 80. A red fragment 60 extends horizontally into pixel A 70, completely across pixel A 70 and partially into pixel B 80. A blue fragment 50 extends completely across pixels A 70 and B 80 at an angle such that the portion in pixel A 70 is completely behind the red fragment 60. However, in pixel B 80, only a portion of the blue fragment 50 is behind the red fragment 60. Thus, in the ideal situation where the Z values of all samples in both pixels A 70 and B 80 are maintained, some contribution by the red fragment 60 would be included in pixel B 80. The pixel A 70 would be completely red, and the pixel B 80 would be mostly blue, with some small red contribution.

By using the method described herein, the front-most Z values for each of the fragments are determined within each of the pixels. The red front-most Z value 66 is valid for the red fragment 60 in both pixels A 70 and B 80. Within pixel A 70, the blue pixel A front-most Z value 56 is behind the red front-most Z value 66. As such, pixel A 70 will be completely red as all samples of the red fragments 60 within pixel A 70 are valid (complete coverage). Within pixel B 80, the blue pixel B front-most Z value 56 is in front of the red front-most Z value 66. As such, because the blue fragment 50 completely covers pixel B 80 (all samples are valid) the entirety of pixel B 80 will be blue. Note that this differs from the ideal case where a small contribution to the coloration of pixel B 80 is made by the red fragment 60. Effectively, this causes a slight color shift on the display. Such a minor color shift is much less noticeable than the "poke through" artifact illustrated in FIG. 1. Thus, the "poke through" artifact is avoided, and a single Z value can be used to represent all samples of a particular fragment with minimal visual consequences.

Figure 5:
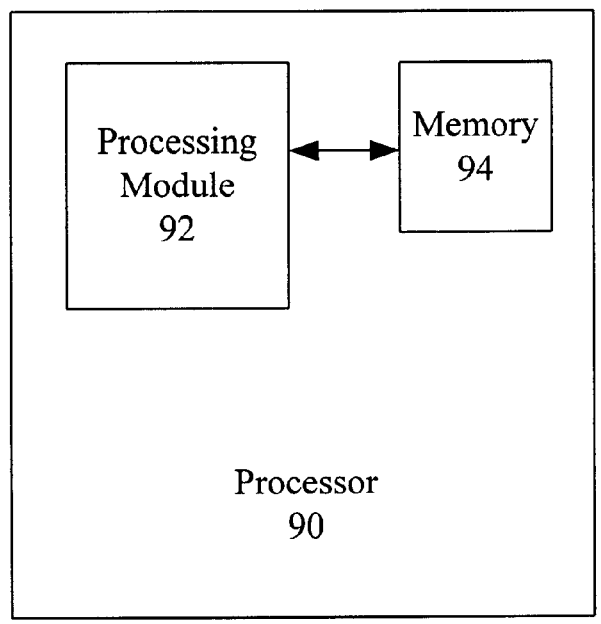
FIG. 5 illustrates a processor for performing reduced Z value resolution graphics processing in accordance with the present invention.

FIG. 5 illustrates a processor 90 that may be used for determining Z values for a fragment in an anti-aliasing video graphics system. The processor 90 includes a processing module 92 and memory 94. The processing module 92 may include a single processing entity or a plurality of processing entities. Such a processing entity may be a microprocessor, microcontroller, digital signal processor, state machine, logic circuitry and/or any device that processes information based on operational and/or programming instructions. The memory 94 may be a single memory device or a plurality of memory devices. Such a memory device may be a read-only memory device, random access memory device, floppy disk, hard drive memory, and/or any device that stores digital information. Note that when the processing module 92 has one or more of its function performed by a state machine and/or logic circuitry, the memory containing the corresponding operational instructions is embedded within the state machine and/or logic circuitry.

Figure 6:
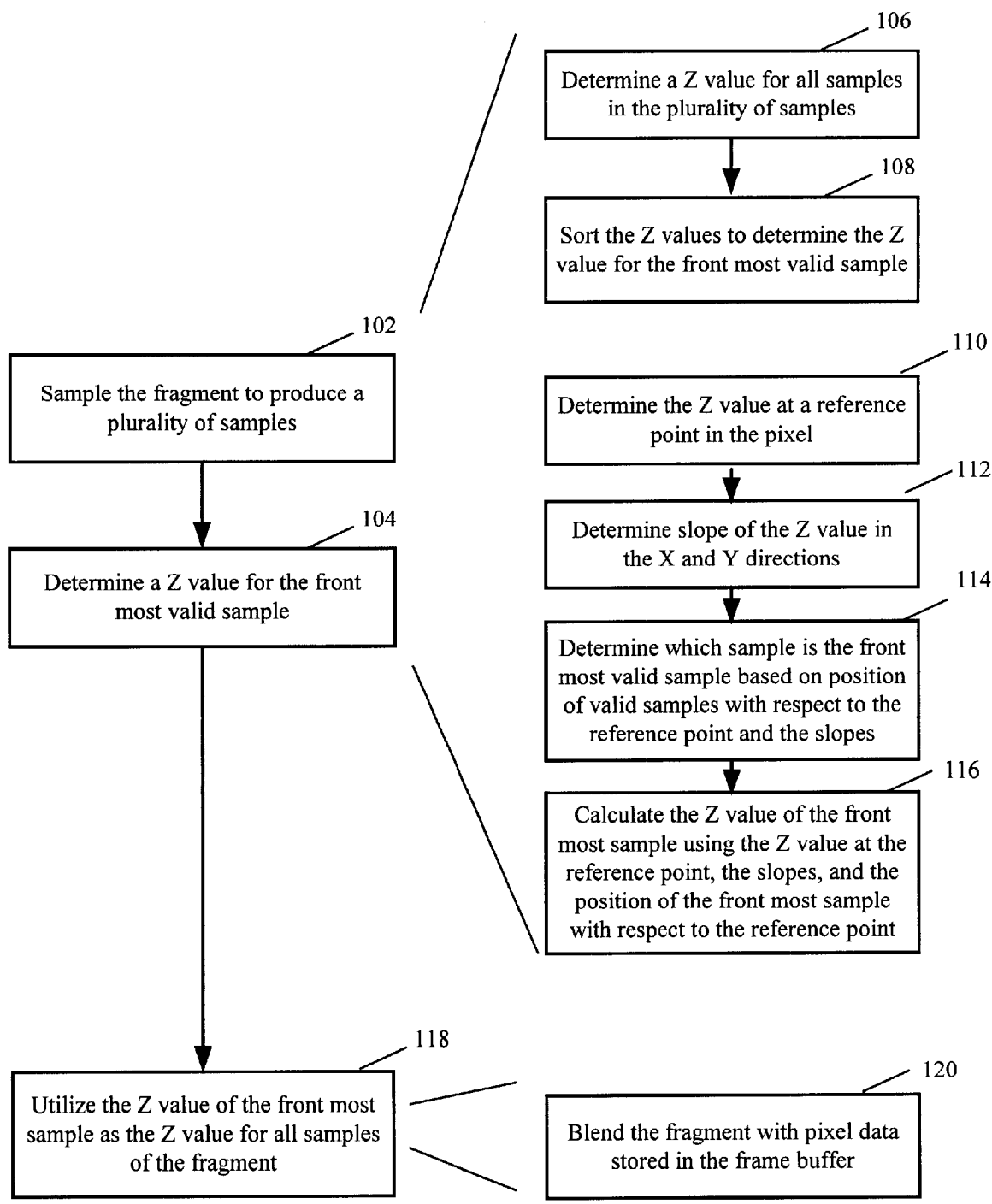
FIG. 6 illustrates a flow diagram of a method for determining Z values for a fragment in an anti-aliasing video graphics system in accordance with the present invention.

The memory 94 stores programming and/or operational instructions that, when executed, allow the processing module 92 to perform the method illustrated in FIG. 6. Note that the processor 90 may implement some of the functions of FIG. 6 through software stored in the memory 94, whereas other portions may be implemented using hardware, or circuitry included within the processor 90. Thus, a mix of hardware and software may be used to perform the method illustrated in FIG. 6.

Figure 4:
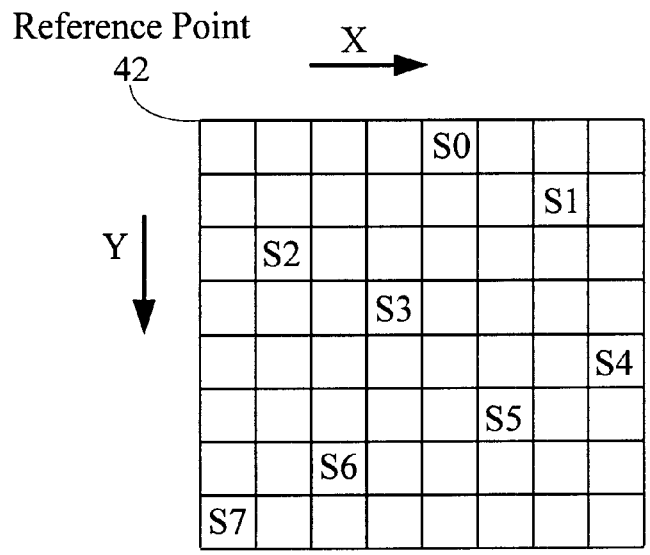
FIG. 4 illustrates a pixel sampling grid in accordance with the present invention.

FIG. 6 illustrates a method for determining Z values for a fragment in an anti-aliasing video graphics system. The method begins a step 102 where a fragment resulting from a video graphics primitive is sampled to produce a plurality of samples. The particular fragment corresponds to a particular pixel within a display, and a preferable sampling scheme is illustrated in FIG. 4. FIG. 4 illustrates a sampling grid 40 that divides a pixel into an array of potential sample points. Samples S0–S7 are located at sample points spread throughout the pixel in various X and Y coordinates. This allows the particular pixel, or fragment, to be characterized with a limited sample set.

In some prior art solutions, each sample within the sampling grid 40 would produce a color value and a Z value for the pixel or fragment at the particular coordinates indicated by the sample within the sample grid 40. Processing and storing the plurality of different color and Z values for the different sample points can consume a large amount of processing bandwidth.

As such, it is desirable to reduce the level of resolution maintained for the sample set, while minimizing the effects that its reduction in resolution has on the final visual result. One such technique reduces the number of Z values maintained for the pixel to a single Z value. As the present invention teaches, if the Z value maintained for the sample set is the Z value corresponding to the front-most valid sample, the visual effects of the reduction in data storage are minimized.

Returning to FIG. 6, at step 104, the Z value for the front-most valid sample is determined. Steps 102 and 104 can be accomplished using a number of different techniques.

One such technique is illustrated in steps 106 and 108. At step 106, the Z value for each of the samples within the sample set is determined. At step 108, the Z values determined at step 106 are sorted to determine the front-most Z value. Depending on the values used to reference the Z-axis in a particular application, this may be the sample with the greatest or the smallest Z value. This technique ensures that the Z value for the front-most sample is accurately determined. This is because each Z value is independently known, and the sorting algorithm can determine which of these Z values correspond to the front-most Z value. However, sorting through the Z values to determine the front-most Z value may require additional processing that, although it provides a precise result, increases the processing demands corresponding to implementation of the method.

An alternate technique for determining the front-most Z value is illustrated in steps 110–114. At step 110, the Z value at a reference point in the pixel is determined. Referring back to FIG. 4, the reference point 42 is shown as the upper left-hand corner of the pixel. If the Z value is determined at this reference point 42, Z values at other points within the sampling grid 40 can be determined based on the change in the Z value across the pixel.

At step 112, the slopes of the Z value in two directions with respect to the reference point 42 are determined. Preferably, the two directions are the directions corresponding to the X-axis and the Y-axis. Thus, the slope of the Z value with respect to the X direction (dZ/dX) represents the change in Z with respect to the X direction. Similarly, the change in Z with respect to the Y coordinate (dZ/dY) can also be determined. Based on these two slopes, the position of the various samples with respect to the reference point 42 in the sampling grid 40, and the Z value at the reference point 42, the front-most sample can be accurately estimated.

For example, if the slope of Z with respect to the X and Y directions is positive (the fragment is further from the viewer at the reference point and closer at the corner opposite the reference point), and the slope in the X direction is greater than that in the Y direction, the samples can be ordered, or ranked, to correspond to their estimated Z values. Thus, if the slope in the X direction is greater than the positive slope in the Y direction, sample S4 will most likely be the front-most sample as it is the most distant from the reference point 42. Depending on the difference between the two slopes, either sample S1 or sample S5 will be the second ranked sample, with S5 being the most likely candidate.

Once the samples in the sampling grid 40 have been ranked or ordered, the front-most valid sample can be determined based on the ranking and a mask that indicates coverage of the pixel by the particular fragment. Valid samples correspond to samples within the pixel that are covered by the fragment being sampled. A mask value can be used to indicate coverage of the pixel by the sample. Thus, if samples S0, S1 and S4 are covered by a particular fragment, the mask value for that fragment may be represented as 00010011, where the 1's indicate coverage by the fragment, and 0's indicate a lack of coverage by the fragment.

Thus, if sample S4 is the first ranked sample, and it is determined based on the mask to be a valid sample, it will be designated the front-most sample, and its Z value can then be calculated. The Z value of the sample S4 can be calculated based on the Z value at the reference point 42, the two slopes, and the positioning of the sample S4 with respect to the reference point. This calculation step is performed at step 116 of FIG. 6.

At step 118, the Z value of the front-most sample is utilized as the Z value for all of the samples within the plurality of samples representing the fragment. The utilization at step 118 may include step 120 where the fragment is blended with pixel data stored in a frame buffer that stores pixels for a particular frame. Blending the fragment with pixel data stored in the frame buffer preferably includes comparing the Z value of the front-most valid sample, which represents the effective Z value of the entire fragment, with at least one Z value included in the pixel data stored in the frame buffer.

Thus, if the Z value for the fragment shows the fragment to be behind the pixel data already stored in the frame buffer, as indicated by the stored data's one or more Z values, the fragment can be discarded as it should not contribute to the displayed image. However, if the Z value of the fragment indicates that the fragment overlays at least a portion of the pixel in its current state, the color of the fragment will be blended with the color of the pixel to produce the resultant color that is stored back into the frame buffer. Similarly, the Z value of the fragment will be included in the resulting Z value or values stored within the frame buffer corresponding to that particular pixel.

Figure 7:
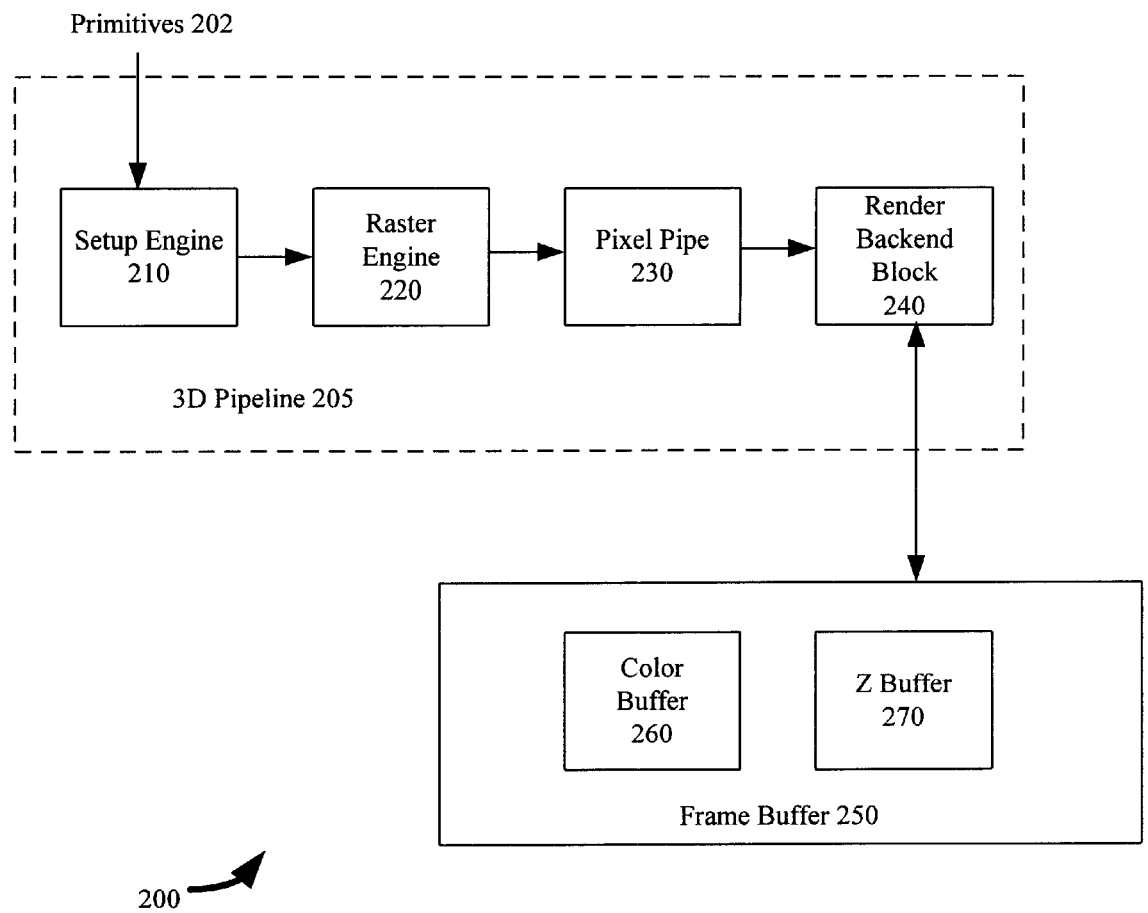
FIG. 7 illustrates a block diagram of a video graphics circuit in accordance with the present invention.

FIG. 7 illustrates a circuit 200 that includes a 3D pipeline 205 operably coupled to a frame buffer 250. The 3D pipeline 205 preferably includes a set-up engine 210, a raster engine 220, a pixel pipe 230, and a render backend block 240. The frame buffer 250 preferably includes a color buffer 260 that stores color information corresponding to pixels in a display frame, and a Z buffer 270 that stores corresponding Z values for the pixels included in the display frame. Preferably, the 3D pipeline 205 is included in the video graphics integrated circuit that may also include two-dimensional graphics processing and other processing blocks that may effect the data stored within the frame buffer 250. Such an integrated circuit is preferably capable of, among other things, rendering three-dimensional video graphics images for display.

The set-up engine 210 produces primitive slope information based on received graphics primitives 202. Preferably, the graphics primitives 202 are triangle primitives, which are commonly used in video graphics applications. Slope information corresponding to these primitives is then provided to the raster engine 220, which is operably coupled to the set-up engine 210. The raster engine 220 generates pixel fragments from the primitive slope information.

Preferably, each pixel fragment includes a color value, a set of coordinates indicating a pixel in the display frame to which the fragment corresponds, a mask value that indicates coverage of the pixel by the fragment, and a Z value for the fragment. Preferably, the mask value is a set of bits, or bit field, that indicates coverage of the pixel by the fragment. The bit field corresponds to a predetermined sampling pattern that includes a plurality of samples for each pixel. Samples corresponding to set bits in the bit field are valid samples in that they are within the coverage of the pixel by the fragment.

Preferably, the Z value, which indicates spatial depth, produced by the raster engine for each fragment is determined based on the front-most valid sample within the fragment. More preferably, the Z value of the front-most valid sample is determined as was described with respect to steps 110–114 of FIG. 6. However, it should be apparent to one of ordinary skill in the art that a number of different techniques can be used to determine or estimate the Z value of the front-most valid sample within a sample set.

The raster engine 220 provides the pixel fragments to the pixel pipe 230, which is operably coupled to raster engine 220. The pixel pipe 230 performs various operations that may modify the color of the pixel fragment as received from the raster engine 220. Such operations can include texture mapping operations. The textured fragment resulting from the operations performed by the pixel pipe 230 are then passed to the render backend block 240, which is operably coupled to the pixel pipe 230 and the frame buffer 250.

The render backend block 250 blends textured fragments with corresponding pixels in the frame buffer 250 as determined by the set of coordinates for each textured fragment. The Z value for each textured fragment is used to blend all valid samples in the textured fragment with the pixel data stored in the frame buffer 250 for the corresponding pixel. Thus, a single Z value is used to represent the Z value for all of the samples within the fragment. This simplifies the processing performed by the render backend block 240 and allows less information to be stored and passed along the 3D pipeline 205.

The blending operations performed by the render backend block 240 are well known in the art, and the resulting pixels produced by the render backend block 240 are stored back into the frame buffer 250. Note that the frame buffer 250, as stated earlier, can be divided into a color buffer 260 and a Z buffer 270, where the color buffer 260 stores color information and the Z buffer 270 stores Z values for pixels in the frame. The frame buffer 250 can be accessed by display hardware to retrieve the pixel information for use in generating the display.

Utilizing a single Z value for entire fragments that may include a plurality of samples allows for more efficient blending operations that require less processing bandwidth. Choosing the Z value that represents each fragment to be the Z value of the front most valid sample within the fragment avoids the "poke through" artifact associated with prior art techniques that selected the single Z value for the fragment based on the Z value of the fragment at a pixel-center location. Although some color shifting may result from the utilization of the Z value of the front most valid sample as the Z value for the entire fragment, the visual effects resulting from such color shifting are preferable to those resulting from "poke through" artifacts.

It should be understood that the implementation of other variations and modifications of the invention in its various aspects should be apparent to those of ordinary skill in the art, and that the invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A method for determining Z values for a fragment in an anti-aliasing video graphics system, comprising:
    sampling the fragment to produce a mask including a plurality of samples, wherein a valid sample indicates coverage of a pixel by the fragment at a portion of the pixel corresponding to the valid sample, wherein the fragment sampling includes:
        determining a Z value at a reference of the pixel,
        determining slopes of the Z value in two directions with respect to the reference point;
    determining a Z value of a front most valid sample of the plurality of samples by:
        identifying which of the pixels is the front most valid sample based on the slopes, position of each of the plurality of samples with respect to the reference point and the mask, and calculating the Z value of the front most valid pixel based on position of the front most valid pixel in relation to the reference point, the slopes and the Z value at the reference point, wherein the Z value of the front most valid sample represents spatial depth of the fragment at the point within the fragment corresponding to the front most sample; and utilizing the Z value of the front most valid sample as the Z value for all samples in the plurality of samples.

2. The method of claim 1, wherein sampling the fragment further comprises determining a Z value for each sample in the plurality of samples, and wherein determining the front most valid sample further comprises sorting the Z values for valid samples to determine the front most valid sample.

3. The method of claim 1, wherein the reference point is the upper left sample point of the fragment, and wherein the slopes represent variation in the Z value along horizontal and vertical directions with respect to the reference point.

4. The method of claim 1, wherein utilizing the Z value of the front most valid sample as the Z value for all samples in the plurality of samples further comprises blending the fragment with pixel data corresponding to the pixel stored in a frame buffer, wherein blending includes comparing the Z value of the front most pixel with at least one Z value included in the pixel data in the frame buffer.

5. A processor, wherein the processor determines Z values for a fragment in an anti-aliasing video graphics system, the processor comprising:

a processing module;

memory operably coupled to the processing module, wherein the memory stores operating instructions that, when executed by the processing module, cause the processing module to perform the functions of:

sampling the fragment to produce a mask including a plurality of samples, wherein a valid sample indicates coverage of a pixel by the fragment at a portion of the pixel corresponding to the valid sample, wherein the fragment sampling includes:

determining a Z value at a reference of the pixel, determining slopes of the Z value with respect to the reference point, and determining a Z value of a front most valid sample of the plurality of samples in a manner that includes determining which of the pixels is the front most valid sample based on the slopes, position of each of the plurality of samples with respect to the reference point and the mask; and calculating the Z value of the front most valid pixel based on the position of the front most valid pixel in relation to the reference point, the slopes and the Z value at the reference point, wherein the Z value of the front most valid sample represents spatial depth of the fragment at the point within the fragment corresponding to the front most sample; and utilizing the Z value of the front most valid sample as the Z value for all samples in the plurality of samples.

6. The processor of claim 5, wherein the memory includes operating instructions such that the processing module determines a Z value for each sample in the plurality of samples, and such that the processing module sorts the Z values for valid samples to determine the front most valid sample.

7. The processor of claim 5, wherein the slopes of the Z value are determined in two directions with respect to the reference point.

8. The processor of claim 5, wherein the reference point is the upper left sample point of the fragment, and wherein the slopes represent variation in the Z value along horizontal and vertical directions with respect to the reference point.

9. The processor of claim 5, wherein the memory includes operating instruction that, when executed, cause the processing module to utilize the Z value of the front most valid sample as the Z value for all samples in the plurality of samples in a manner that includes blending the fragment with pixel data corresponding to the pixel stored in a frame buffer, wherein blending includes comparing the Z value of the front most pixel with at least one Z value included in the pixel data in the frame buffer.

10. A video graphics circuit, comprising:

a setup engine, wherein the setup engine produces primitive slope information based on received graphics primitives;

a raster engine operably coupled to the setup engine, wherein the raster engine generates pixel fragments from the primitive slope information, wherein each pixel fragment includes:

a color value;

a set of coordinates indicating a pixel in a display frame to which the fragment corresponds;

a mask value that indicates coverage of the pixel by the fragment, wherein coverage is indicated by set bits in a bit field corresponding to a predetermined sampling pattern that includes a plurality of samples, wherein the raster engine produces a plurality of samples of the fragment, a subset of the samples corresponding to the set bits in the bit field are valid samples in that they are within the coverage of the pixel by the fragment; and a Z value for the fragment, wherein the Z value represents spatial depth of a front most valid sample of the fragment, wherein the Z value is determined by:

determining a Z value at a reference point of the pixel, determining slopes of the Z value in two directions with respect to the reference point, determining which of the pixels is the front most valid sample based on the mask, the slopes, and the position of each of the plurality of samples in the predetermined sampling pattern with respect to the reference point, and determining the Z value of the front most valid pixel based on position of the front most valid pixel in relation to the reference point, the slopes, and the Z value at the reference point;

a pixel pipe operably coupled to the raster engine, wherein the pixel pipe performs texture mapping operations on the pixel fragments to produce textured fragments;

a frame buffer that stores color and Z values for a plurality of pixels included in a frame; and a render backend block operably coupled to the pixel pipe and the frame buffer, wherein the render backend block blends textured fragments with corresponding pixels in the frame buffer as determined by the set of coordinates for each textured fragment, wherein the Z value for a textured fragment is used to blend all valid samples in the textured fragment.

11. The video graphics circuit of claim 10, wherein the raster engine further performs the functions of:

determining Z values for the valid samples in the plurality of samples; and sorting the Z values for the valid samples to determine the front most valid sample.

12. The video graphics circuit of claim 10, wherein the reference point is the upper left sample point of the fragment, and wherein the slopes represent variation in the Z value along horizontal and vertical directions with respect to the reference point.

13. The video graphics circuit of claim 10, wherein the frame buffer further comprises:

a color buffer that stores color values for each of the plurality of pixels in the display frame; and a Z buffer that stores Z values for each of the plurality of pixels in the display frame.

14. The video graphics circuit of claim 10, wherein the setup engine, the raster engine, the pixel pipe, and the render backend block of the video graphics circuit are included on a video graphics integrated circuit.

15. The video graphics circuit of claim 10, wherein the video graphics integrated circuit is used to render three-dimensional video graphics images for display.

* * * * *